United States Patent
Park et al.

(10) Patent No.: US 10,994,718 B2
(45) Date of Patent: May 4, 2021

(54) MULTI-MASTER SYSTEM, POWER CONTROLLER AND OPERATING METHOD OF THE MULTI-MASTER SYSTEM

(71) Applicant: HYUNDAI AUTRON CO., LTD., Seoul (KR)

(72) Inventors: Hyung Min Park, Seoul (KR); Ji Haeng Lee, Hwaseong-si (KR); Dong On Jang, Uiwang-si (KR); Won Hee Jo, Goyang-si (KR)

(73) Assignee: HYUNDAI AUTRON CO., LTD., Seoul (KR)

( * ) Notice: Subject to any disclaimer, the term of this patent is extended or adjusted under 35 U.S.C. 154(b) by 150 days.

(21) Appl. No.: 16/020,854

(22) Filed: Jun. 27, 2018

(65) Prior Publication Data

US 2020/0001854 A1 Jan. 2, 2020

(51) Int. Cl.
*B60W 10/08* (2006.01)
*G06F 1/26* (2006.01)
*B60R 16/023* (2006.01)
*G06F 13/362* (2006.01)
*B60L 50/10* (2019.01)

(52) U.S. Cl.
CPC ............. *B60W 10/08* (2013.01); *B60L 50/10* (2019.02); *B60R 16/023* (2013.01); *G06F 1/266* (2013.01); *G06F 13/362* (2013.01)

(58) Field of Classification Search
CPC ...... B60W 10/08; B60L 50/10; B60R 16/023; G06F 1/266; G06F 13/362
See application file for complete search history.

(56) References Cited

U.S. PATENT DOCUMENTS

| | | | |
|---|---|---|---|
| 7,103,759 B1 | 9/2006 | Blixt | |
| 7,627,708 B2* | 12/2009 | Bohm | G06F 13/385 710/104 |
| 9,221,409 B1 | 12/2015 | Gauthier et al. | |
| 2007/0088889 A1* | 4/2007 | Cruz | G06F 13/385 710/260 |
| 2010/0161725 A1* | 6/2010 | Gershom | G06F 3/1203 709/203 |
| 2011/0119423 A1* | 5/2011 | Kishore | G06F 13/4022 710/302 |
| 2016/0077984 A1* | 3/2016 | Steinert | G06F 13/1642 710/309 |
| 2016/0179717 A1* | 6/2016 | Davis | G06F 15/7892 710/308 |

(Continued)

FOREIGN PATENT DOCUMENTS

JP 2014-004858 A 1/2014
JP 2016-165990 A 9/2016
(Continued)

*Primary Examiner* — Nimesh G Patel
(74) *Attorney, Agent, or Firm* — Morgan, Lewis & Bockius LLP

(57) ABSTRACT

A multi-master system includes a first master, a second master, and an integrated control circuit controlled by each of the first and second masters. The integrated control circuit includes a first dedicated block configured to provide a first function to the first master, a second dedicated block configured to provide a second function to the second master, and a global using block configured to provide a common function to each of the first and second masters.

13 Claims, 10 Drawing Sheets

(56) References Cited

U.S. PATENT DOCUMENTS

2016/0239074 A1    8/2016  Lee et al.

FOREIGN PATENT DOCUMENTS

| JP | 2017-107394 A | 6/2017 |
| KR | 10-2016-0076270 A | 6/2016 |
| WO | WO 02/15517 A2 | 2/2002 |
| WO | WO 2014/027558 A1 | 2/2014 |

* cited by examiner

FIG.4

| Block | Register 1 | Register 2 | Comment |
|---|---|---|---|
| Global Using Block 1 | 0 | 0 | Unused (Default) |
|  | 0 | 1 | Controlled by second master |
|  | 1 | 0 | Controlled by first master |
|  | 1 | 1 | Error is indicated as fault flag |
| Global Using Block 2 | 0 | 0 | Unused (Default) |
|  | 0 | 1 | Controlled by second master |
|  | 1 | 0 | Controlled by first master |
|  | 1 | 1 | Error is indicated as fault flag |

MULTI-MASTER SYSTEM, POWER CONTROLLER AND OPERATING METHOD OF THE MULTI-MASTER SYSTEM

TECHNICAL FIELD

Embodiments of the present disclosure relate to a multi-master system, a power controller, and an operating method of the multi-master system.

BACKGROUND

There are a great number of independent electronic control units (ECUs) in a vehicle. Various studies have been actively conducted on an integrated control device to control these ECUs.

SUMMARY

The present disclosure provides a multi-master system, a power controller, and an operating method of the multi-master system.

Example embodiments of the present disclosure provide a multi-master system. The multi-master system includes a first master, a second master, and an integrated control circuit controlled by each of the first and second masters. The integrated control circuit includes a first dedicated block configured to provide a first function to the first master, a second dedicated block configured to provide a second function to the second master, and a global using block configured to provide a common function to each of the first and second masters.

In example embodiments, the integrated control circuit may further include a first selection register configured to store information associated with the first function and the common function and a second selection register configured to store information associated with the second function and the common function.

In example embodiments, the integrated control circuit may further include a bias block configured to generate at least one bias.

In example embodiments, the bias block may include a bandgap reference generator, an oscillator or a current source.

In example embodiments, the first selection register may include a first bias register configured to store flag information associated with the bias block, and the second selection register may include a second bias register configured to store the flag information.

In example embodiments, the first selection register may include a first available configuration register configured to store information associated with the first function and a first available configuration register configured to store information associated with the common function. The second selection register may include a second available configuration register configured to store information associated with the second function and a second available configuration register configured to store information associated with the common function.

In example embodiments, the global using block may be controlled by one of the first and second masters according to values stored in the first and second available configuration registers.

In example embodiments, the global using block may be controlled by an external electronic control unit of the multi-master system according to values stored in the first and second available configuration registers.

In example embodiments, the integrated control circuit may include a master selection unit configured to generate a selection signal according to values stored in the first and second available configuration registers and a multiplexer configured to select whether to connect the first master to the global using block or to connect the second master to the global using block in response to the selection signal.

In example embodiments, the multi-master system may further include a first interface configured to perform serial communication between the first master and the global using block and a second interface configured to perform serial communication between the second master and the global using block.

Example embodiments of the present disclosure provide a power controller. The power controller includes a first microcomputer configured to perform power control, a second microcomputer configured to perform motor control, and an integrated control circuit configured to supply first power to the first microcomputer and supply second power to the second microcomputer. The integrated control circuit includes a bias block configured to generate at least one bias required to generate the first power and the second power, a first dedicated block configured to generate the first power using the at least one bias, a second dedicated block configured to generate the second power using the at least one bias, and a global using block configured to provide a common function to one of the first and second microcomputers according to a master selection operation.

In example embodiments, the master selection operation may include a register setup operation.

In example embodiments, the register setup operation may be performed in the integrated control circuit in response to a serial peripheral interface (SPI) command of each of the first and second microcomputers.

In example embodiments, the power controller may further include a controller area network (CAN) transceiver configured to perform communication between at least one of the first and second microcomputers and at least one external sensor or electronic control unit.

Example embodiments of the present disclosure provide an operating method of a multi-master system. The operating method includes setting up specific use blocks configured to provide a specific use function to each of masters depending on first register setup and setting up a global using block configured to provide a common function of the masters depending on second register setup. The second register setup is performed in response to a serial peripheral interface (SPI) command of each of the masters.

In example embodiments, the operating method may further include setting up a bias block configured to provide a bias required for the specific function depending on third register setup.

In example embodiments, setting up the bias block may include copying flag information corresponding to the bias and storing the copied flag information in corresponding bias registers.

In example embodiments, setting up the specific blocks may include storing information associated with the specific use function in a available configuration register.

In example embodiments, setting up the global using block may include storing information associated with use of the common function in an available configuration register corresponding to each of the masters.

In example embodiments, the information associated with use of the common function may include information on whether it is unused, information associated with a mater using the common function or error information.

BRIEF DESCRIPTION OF THE DRAWINGS

The present disclosure will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the present disclosure.

FIG. 4 illustrates set-up available configuration registers of a master selection unit shown in FIG. 2.

DETAILED DESCRIPTION

Figure 1:
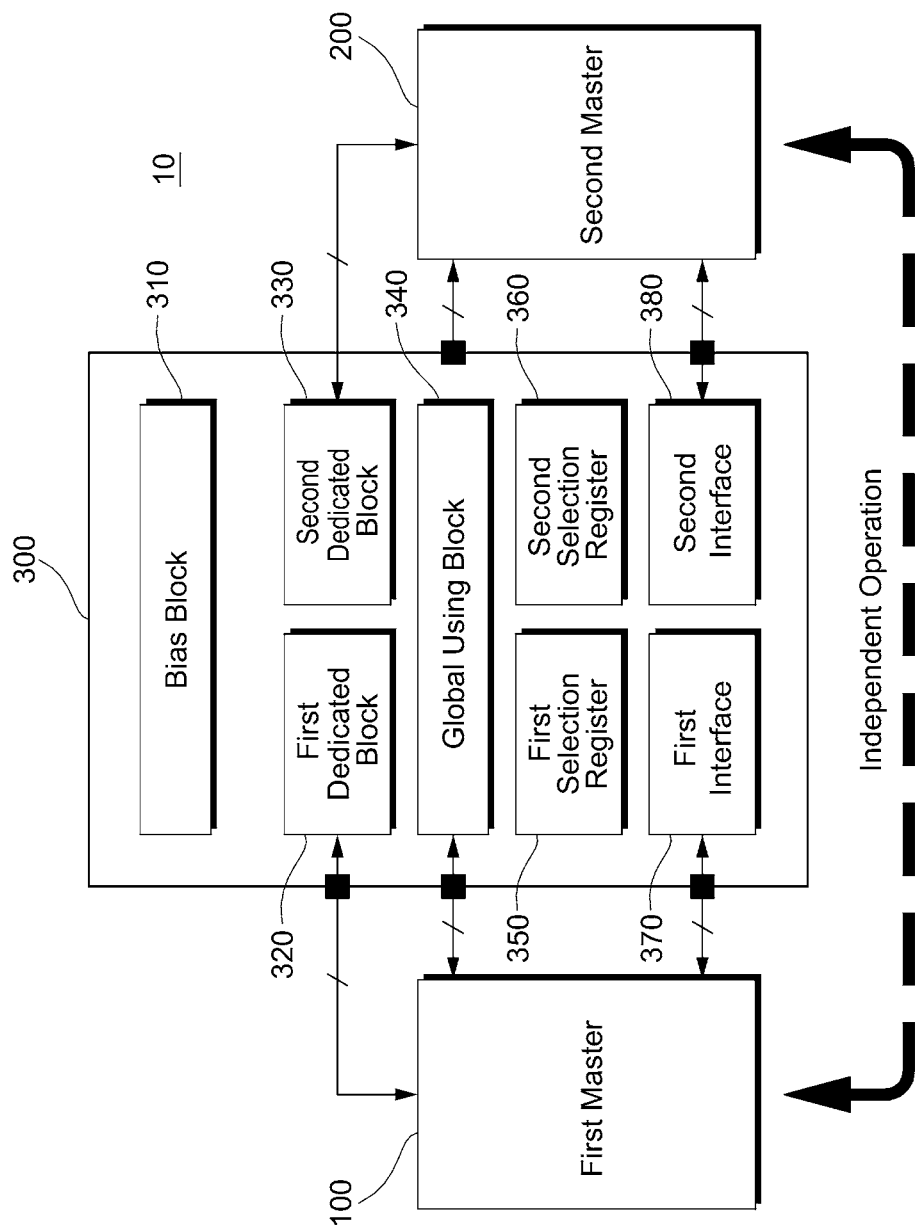
FIG. 1 illustrates a multi-master system to describe the concept of the present disclosure.

The advantages and features of the present disclosure and methods of achieving them will be apparent from the following exemplary embodiments that will be described in more detail with reference to the accompanying drawings. It should be noted, however, that the present disclosure is not limited to the following exemplary embodiments, and may be implemented in various forms. Accordingly, the exemplary embodiments are provided only to disclose the present disclosure and let those skilled in the art know the category of the present disclosure.

In the specification, it will be understood that when an element is referred to as being "on" another layer or substrate, it can be directly on the other element, or intervening elements may also be present. In the drawings, thicknesses of elements are exaggerated for clarity of illustration.

Exemplary embodiments of the invention will be described below with reference to cross-sectional views, which are exemplary drawings of the invention. The exemplary drawings may be modified by manufacturing techniques and/or tolerances. Accordingly, the exemplary embodiments of the invention are not limited to specific configurations shown in the drawings, and include modifications based on the method of manufacturing the semiconductor device. For example, an etched region shown at a right angle may be formed in a rounded shape or formed to have a predetermined curvature. Therefore, regions shown in the drawings have schematic characteristics. In addition, the shapes of the regions shown in the drawings exemplify specific shapes of regions in an element, and do not limit the invention. Though terms like a first, a second, and a third are used to describe various elements in various embodiments of the present disclosure, the elements are not limited to these terms. These terms are used only to tell one element from another element. An embodiment described and exemplified herein includes a complementary embodiment thereof.

The terms used in the specification are for the purpose of describing particular embodiments only and are not intended to be limiting of the invention. As used in the specification, the singular forms "a", "an" and "the" are intended to include the plural forms as well, unless the context clearly indicates otherwise. It will be further understood that the terms "comprises" and/or "comprising", when used in the specification, specify the presence of stated features, integers, steps, operations, elements, and/or components, but do not preclude the presence or addition of one or more other features, integers, steps, operations, elements, components, and/or groups thereof.

The present disclosure will now be described more fully hereinafter with reference to accompanying drawing, in which example embodiments of the present disclosure are shown.

FIG. 1 illustrates a multi-master system 10 to describe the concept of the present disclosure. Referring to FIG. 1, the multi-master system 10 may include a first master 100, a second master 200, and an integrated control circuit 300. Although the two masters 100 and 200 are shown in FIG. 1 for brevity of description, it should be understood that the number of masters of the present disclosure is not to be construed as being limited by the illustrative embodiments.

Each of the first and second masters 100 and 200 may be a device configured to independently perform identical/similar/different functions. In example embodiments, each of the first and second masters 100 and 200 may be a microcontroller unit (MCU).

The integrated control circuit 300 may be implemented to integrally support at least one function of each of the first and second masters 100 and 200. In example embodiments, the at least one function may be associated with power, input, output or the like.

The integrated control circuit 300 may be implemented to ensure independence in operation of each of the masters 100 and 200. Each of the first and second masters 100 and 200 may be a master of the integrated control circuit 300.

The integrated control circuit 300 may include a bias block 310, first and second specific use blocks 320 and 330, a global using block 340, first and second selection registers 350 and 360, and first and second interfaces 370 and 380.

The bias block 310 may be implemented to provide at least one bias required to perform functions of the integrated control circuit 300. In example embodiments, the bias is associated with power and the bias block 310 may include, for example, a bandgap reference generator (BRG), an oscillator (OSC), a current source, and the like. On the other hand, it should be understood that an internal configuration of the bias block 310 is not to be construed as being limited by the illustrative embodiments.

The first and second specific use blocks 320 and 330 may be implemented to support functions required only for the corresponding masters 100 and 200, respectively. For example, the first dedicated block 320 may be implemented to supply first power required to drive the first master 100. And the second dedicated block 330 may be implemented to generate and supply second power required to drive the second master 200. The first power and the second power may be different from each other.

The global using block 340 may be implemented to support various functions which may be commonly used in the first and second masters 100 and 200. The global using block 340 may be implemented to provide various functions by register selection of each of the first and second masters 100 and 200.

Each of the first and second selection registers 350 and 360 may be implemented to store information associated with use of the bias block 310, the specific use blocks 320 and 330, and the global using block 340.

The first and second interfaces 370 and 380 may be implemented to communicate with the corresponding masters 100 and 200, respectively. In example embodiments, each of the first and second interfaces 350 and 370 may be implemented in a serial communication interface. For example, the serial communication interface may be a serial peripheral interface (SPI), inter integrated circuit (I2C), MICROWIRE or the like. The first and second masters 100 and 200 may store register setup information used in the corresponding selection registers 350 and 360 using the corresponding interfaces 370 and 380, respectively.

Although not shown in FIG. 1, the integrated control circuit 300 may include a watchdog configured to monitor each of the first and second masters 100 and 200.

A typical multi-master system includes masers each including a controller to support power/function of each master. Meanwhile, the multi-master system 10 according to example embodiments of the present disclosure includes the single integrated control circuit 300 to support powers/functions of the plurality of masters 100 and 200, which causes a chip size to be reduced accordingly. Moreover, the multi-master system 10 according to example embodiments of the present disclosure may ensure independence in operation of each of the masters 100 and 200 in a register setup manner.

Figure 2:
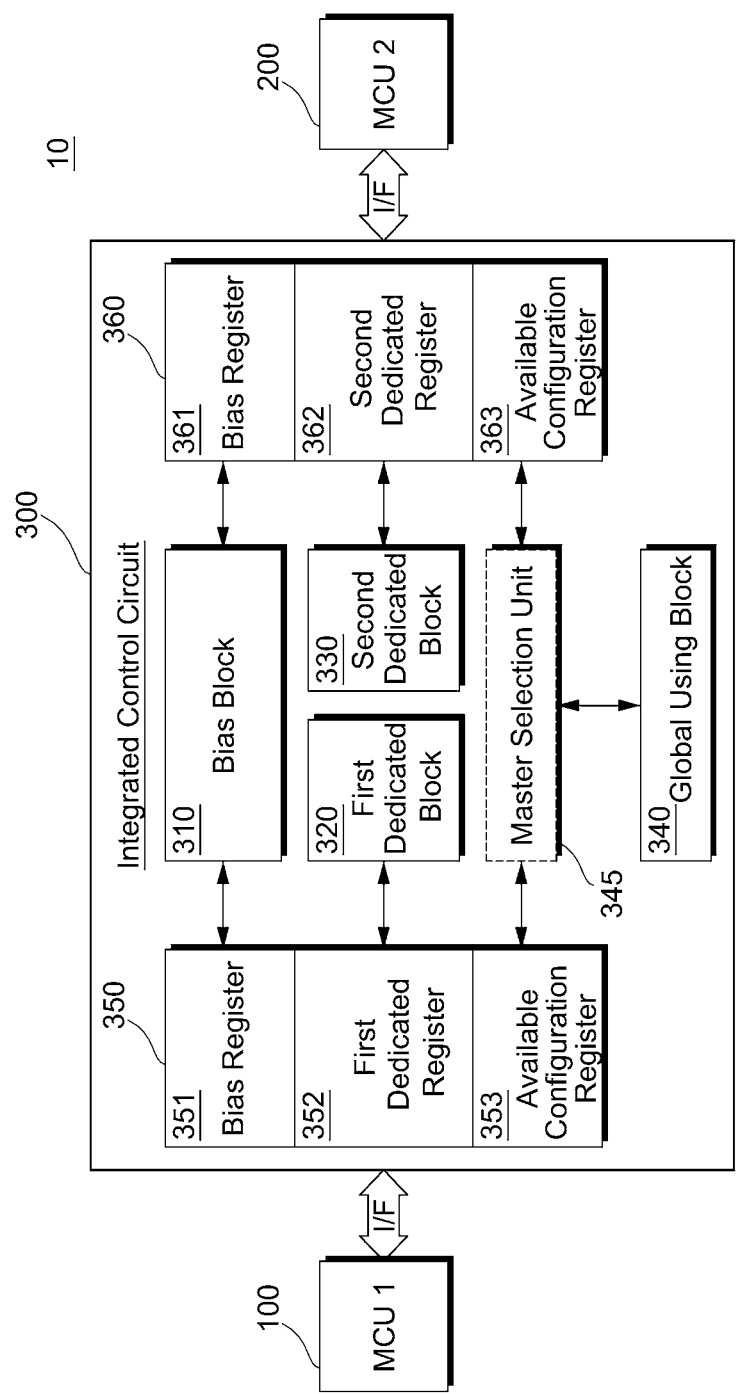
FIG. 2 illustrates the setup of a selection register shown in FIG. 1.

FIG. 2 illustrates the setup of a selection register shown in FIG. 1. Referring to FIG. 2, the first and second selection registers 350 and 360 may include bias registers 351 and 361, available configuration registers 352 and 362, and available configuration registers 353 and 363, respectively.

Each of the first and second bias registers 351 and 361 may store the same information to provide a bias. Although the bias registers 351 and 361 independently exist in FIG. 2, it should be understood that they may be implemented as a single bias register.

The first and second available configuration registers 352 and 362 may store information to set up functions of the corresponding specific use blocks 320 and 330, respectively. The setup information may be transmitted from a nonvolatile memory (not shown) at the same time as the integrated control circuit 300 is powered on.

The first and second available configuration registers 353 and 363 may store information to set up functions of the global using block 340 used in the corresponding masters 100 and 200, respectively. The setup information may be determined by the first and second maters 100 and 200. That is, the first and second masters 100 and 200 may change the setup information of the corresponding available configuration registers 353 and 363, respectively.

In FIG. 2, the integrated control circuit 300 further includes a master selection unit 345. The master selection unit 345 may allow the functions of the global using block 340 to be selectively used for each of the masters 100 and 200. That is, each of the masters 100 and 200 may selectively receive the functions of the global using block 340 depending on the master selection unit 345.

Figure 3:
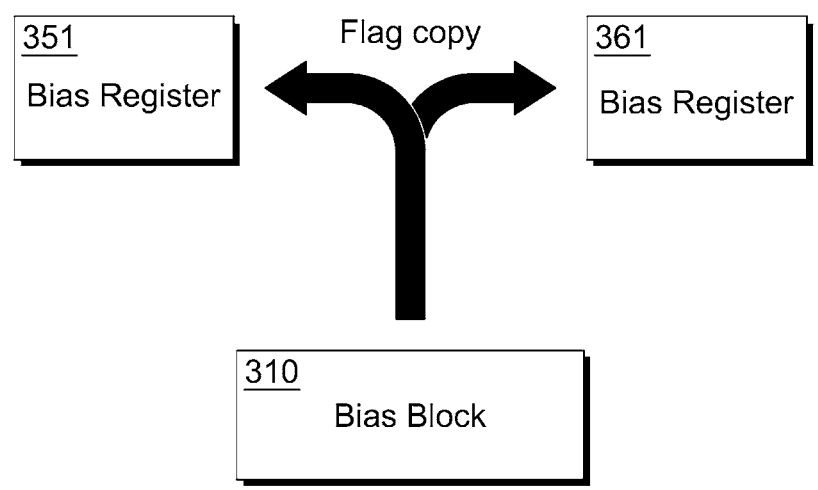
FIG. 3 illustrates the setup of bias registers shown in FIG. 2.

FIG. 3 illustrates the setup of the bias registers 351 and 361 shown in FIG. 2. Referring to FIG. 3, the bias block 310 may set up the same flag to the first and second bias registers 351 and 361. The flag is register setup information to set up a bias. The bias block 310 is an un-configurable block, which may only set up a fault flag stored in the bias registers 351 and 361. The fault flag may be set up to the first and second registers 351 and 361. The masters 100 and 200 cannot change the setup of the bias block 310. That is, the masters 100 and 200 cannot set up functions of the bias block 310.

On the other hand, an operation mode of the global using block 340 may be set up by a command of each of the masters 100 and 200. That is, each of the masters 100 and 200 may set up the operation mode, i.e., functions of the global using block 340. The multi-master system 10 may ensure independence of each master. The global using block 340 may provide means for preventing malfunction of any one master. To this end, a master selection operation may be performed on a register area.

FIG. 4 illustrates set-up available configuration registers 353 and 363 of the master selection unit 345 shown in FIG. 2. Referring to FIG. 4, block operations, i.e., functions of the global using block 340 may vary depending on values stored in the available configuration registers 353 and 363. For brevity of description, it will be assumed that each of the available configuration registers 353 and 363 includes two registers.

A first global using block operation may be controlled according to a value stored in the available configuration register 353. When the value stored in the available configuration register 353 is '00', the first global using block operation is unused. When the value stored in the available configuration register 353 is '01', the first global using block operation may be controlled by the second master 200. When the value stored in the available configuration register 353 is '10', the first global using block operation may be controlled by the first master 100. When the value stored in the available configuration register 353 is '11', an error of the first global using block operation may be indicated as a fault flag.

A second global using block operation may be controlled according to a value stored in the available configuration register 363. When the value stored in the available configuration register 363 is '00', the second global using block operation is unused. When the value stored in the available configuration register 363 is '01', the second global using block operation may be controlled by the second master 200. When the value stored in the available configuration register 363 is '10', the second global using block operation may be controlled by the first master 100. When the value stored in the available configuration register 363 is '11', an error of the second global using block operation may be indicated as a fault flag.

Figure 5:
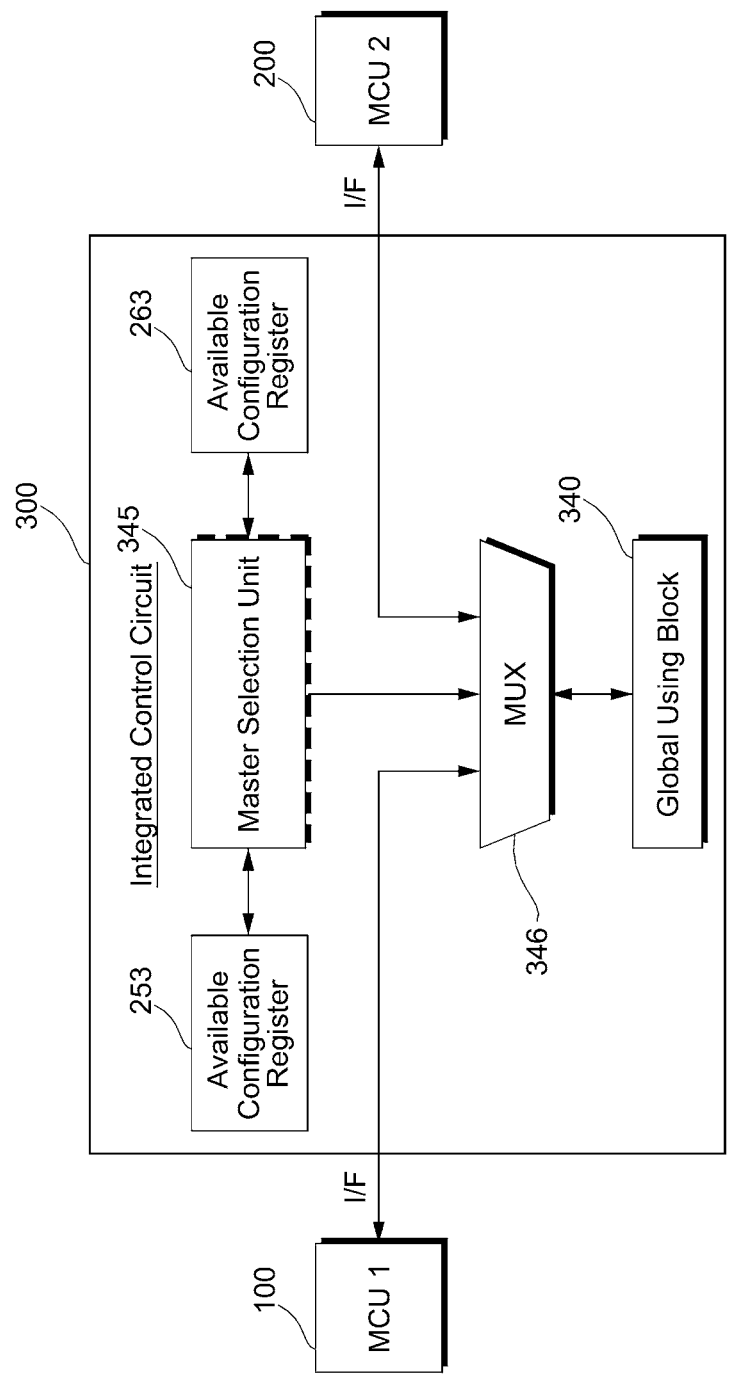
FIG. 5 illustrates selection of a block operation of a global using block according to example embodiments of the present disclosure.

FIG. 5 illustrates selection of a block operation of the global using block 340 according to example embodiments of the present disclosure. Referring to FIGS. 4 and 5, connection of the global using block 340 of the masters 100 and 200 may be determined according to a selection signal of a multiplexer 346 of the master selection unit 345. The master selection unit 345 may generate a selection signal based on information of the available configuration registers 253 and 263.

On the other hand, the multi-master system 10 according to example embodiments of the present disclosure may be used as a power controller in a vehicle.

Figure 6:
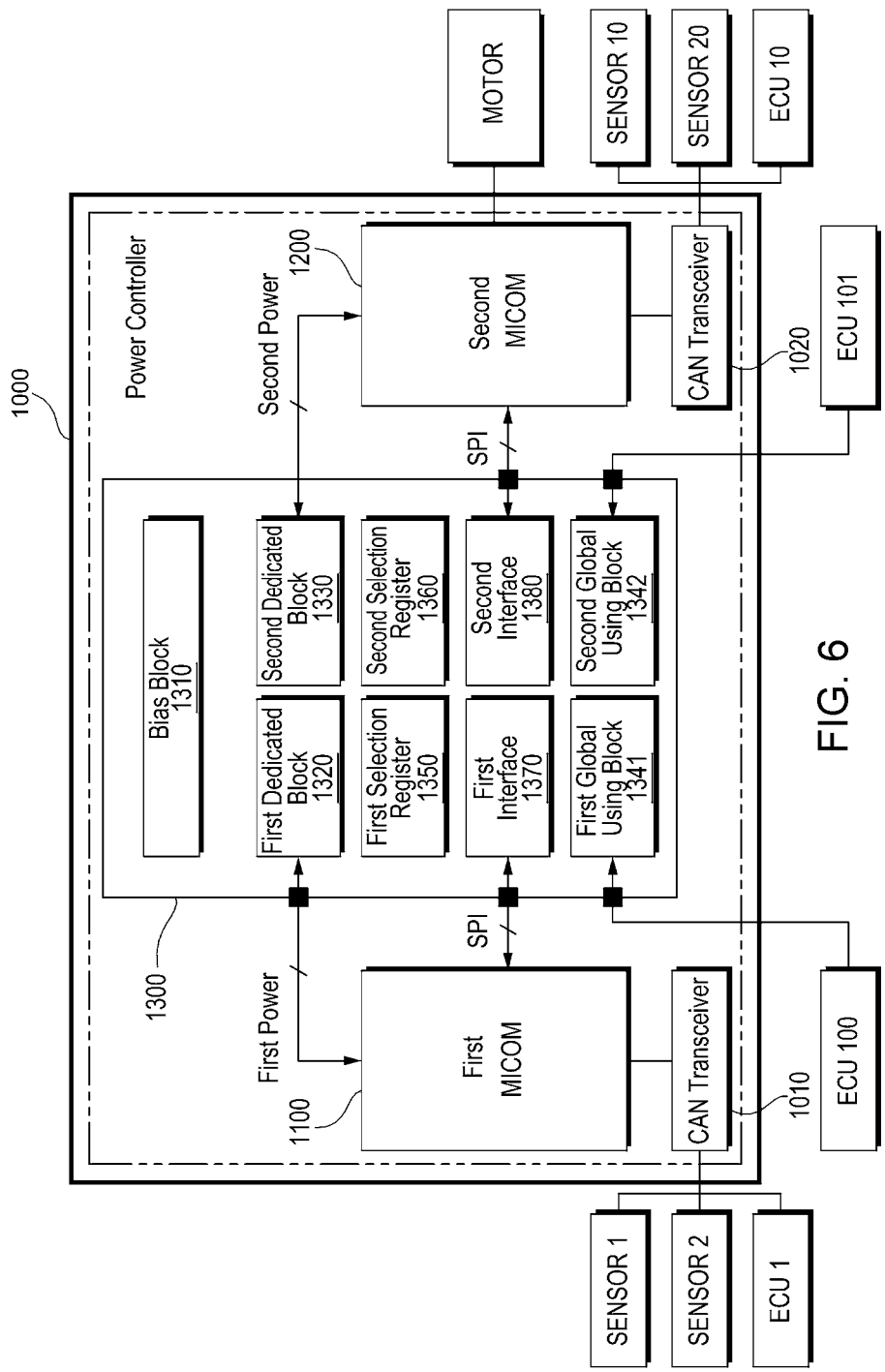
FIG. 6 illustrates a power controller according to example embodiments of the present disclosure.

FIG. 6 illustrates a power controller 1000 according to example embodiments of the present disclosure.

A first microcomputer (MICOM) 1100 may be implemented to perform a power control function. For example, the power control function may include a function to perform engine/motor torque distribution. The first microcomputer 1100 may be implemented to control one or more sensors SENSOR 1 and SENSOR 2 or at least one electronic control unit ECU 1 through a controller area network (CAN) transceiver 1010.

It should be understood that the first microcomputer 1100 is not limited to transmitting and receiving data in a CAN manner. In addition to the CAN manner, data may be transmitted and received by various communication manners such as LIN, CAN-FD, FlexRay, Ethernet, MOST, and APIX.

A second microcomputer (MICOM) 1200 may be implemented to perform a motor control function. The second microcomputer 1200 may be implemented to control a motor. Moreover, the second microcomputer 1200 may be implemented to control one or more sensors SENSOR 10 and SENSOR 20 or at least one electronic control unit (ECU) 101 through the CAN transceiver 1020.

An integrated control circuit 1300 may be implemented with the same operation or the same configuration as the integrated control circuit 300 described in FIGS. 1 to 5. A bias block 1310, a first dedicated block 1320, a second dedicated block 1330, a second selection register 1350, a second selection register 1360, a first interface 1370, and a second interface 1380 are implemented the same as the bias block 310, the first dedicated block 320, the second specific block 330, the first selection register 350, the second selection register 360, the first interface 370, and the second interface 380, respectively.

Unlike the global using block 340 shown in FIG. 1, first and second global using blocks 1341 and 1342 may be implemented to be used not only in first and second microcomputers 1100 and 1200 but also in electronic control units (ECUs) 100 and 101 outside the power controller 1000.

In example embodiments, the first dedicated block 1320 may be implemented to supply first power to the first microcomputer 1100 and the second dedicated block 1330 may be implemented to supply second power to the second microcomputer 1200.

In example embodiments, the first interface 1370 may be implemented to communicate with the first microcomputer 1100 in an SPI manner and the second interface 1380 may be implemented to communicate with the second microcomputer 1200 in the SPI manner.

In example embodiments, the power controller 1000 may be implemented as a printed circuit board (PCB).

The power controller 1000 according to example embodiments of the present disclosure may be optimized in various types of systems according to register setup.

Figure 7:
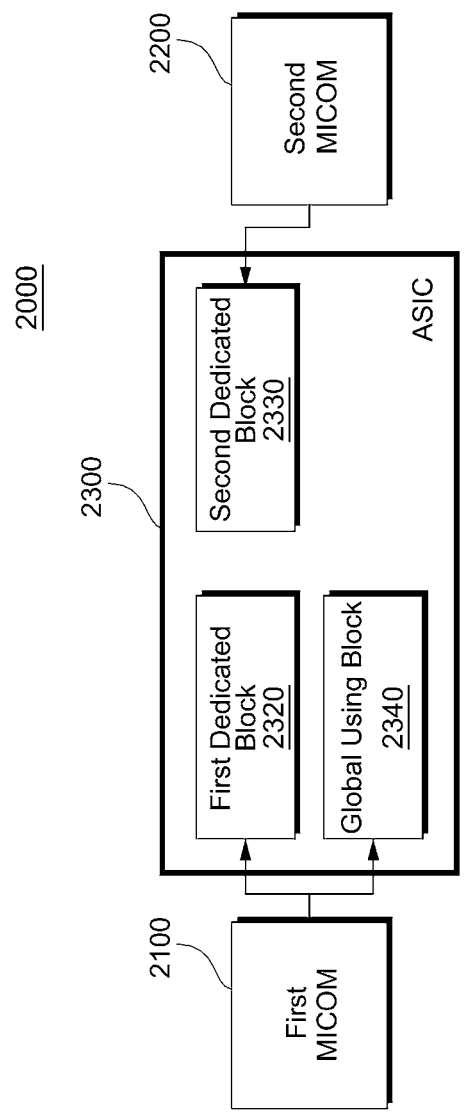
FIG. 7 illustrates a power controller applicable to a hybrid system.

FIG. 7 illustrates a power controller 2000 applicable to a hybrid system. The power controller 2000 may be implemented as the power controller 1000 shown in FIG. 6. Referring to FIG. 7, a first microcomputer 2100 may be supplied with power/input/output functions required for power control by a first dedicated block 2320 and a global using block 2340. A second microcomputer 2200 may be supplied with power/input/output functions required for motor control by a second dedicated block 2330.

Figure 8:
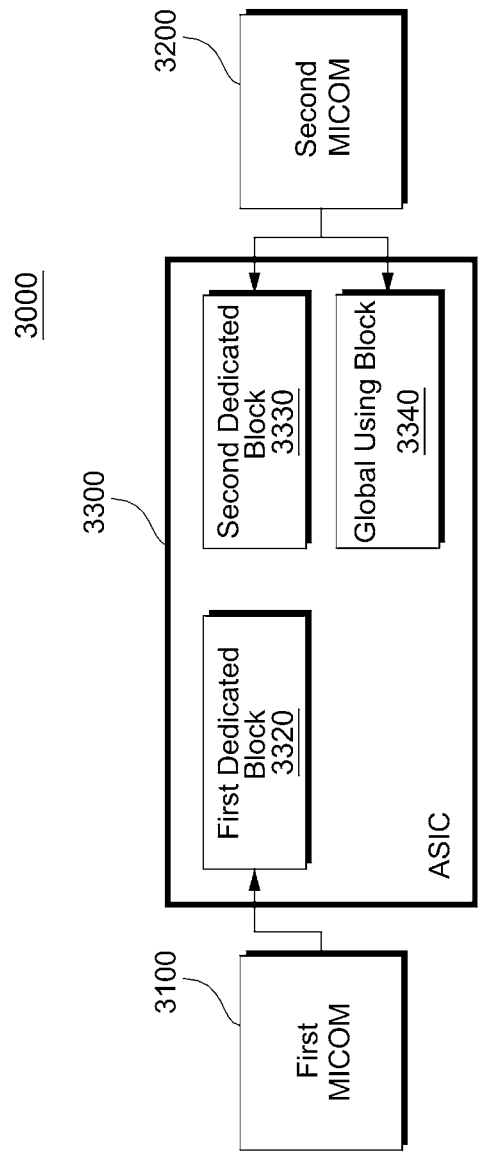
FIG. 8 illustrates a power controller applicable an electric vehicle.

FIG. 8 illustrates a power controller 3000 applicable an electric vehicle. Referring to FIG. 8, unlike shown in FIG. 7, a first microcomputer 3100 may be supplied with power/input/output functions required for power control by a first dedicated block 3320 and a second microcomputer 3200 may be supplied with power/input/output functions required for motor control by a second dedicated block 3330 and a global using block 3340.

Figure 9:
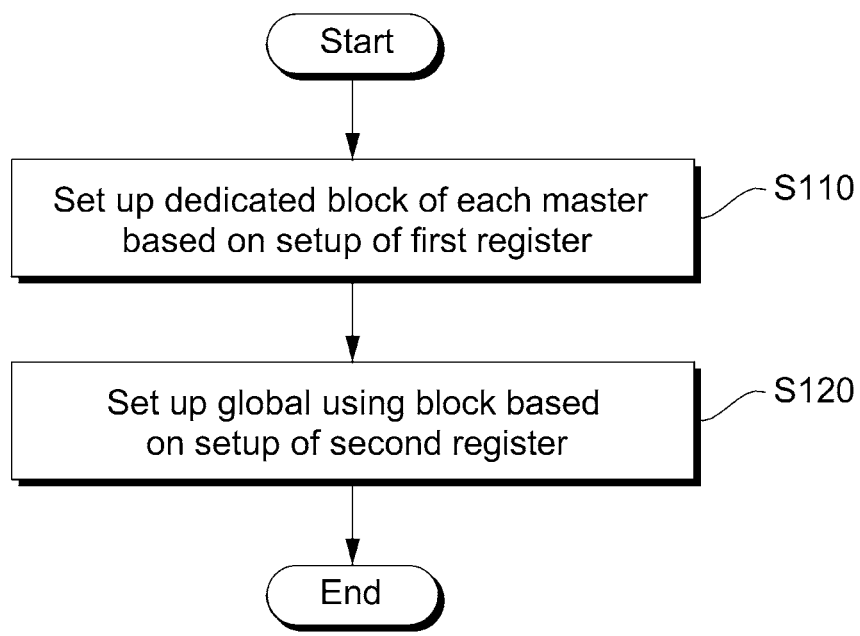
FIG. 9 illustrates a setup method of an integrated control circuit according to example embodiments of the present disclosure.

FIG. 9 illustrates a setup method of an integrated control circuit according to example embodiments of the present disclosure. With reference to FIGS. 1 to 9, a setup method of an integrated control circuit will now be described below.

A dedicated block of each master may be set up depending on first register setup (S110). The first register setup may be performed by an internal operation of an integrated control circuit. In example embodiments, setting up the specific use blocks may include storing information associated with a specific use function in a available configuration register.

A global using block may be set up depending on second register setup (S120). The second register setup may be performed by serial communication between masters and the integrated control circuit. In example embodiments, the second register setup may be performed in response to a serial peripheral interface (SPI) command of each master.

In example embodiments, setting up the global using block may include storing information associated with use of a common function in an available configuration register corresponding to each master. In example embodiments, the information associated with a common function may include information on whether it is unused, information associated with a mater using the common function or error information.

In example embodiments, the setup method may further include setting up a bias block to provide a bias required for the specific use function depending on third register setup. In example embodiments, setting up the bias block may include copying flag information corresponding to the bias and storing the copied flag information in corresponding bias registers.

The inventive concept of the present disclosure may be applied to a power management integrated circuit (PMIC) configured to manage powers of a plurality of microcontroller units.

Figure 10:
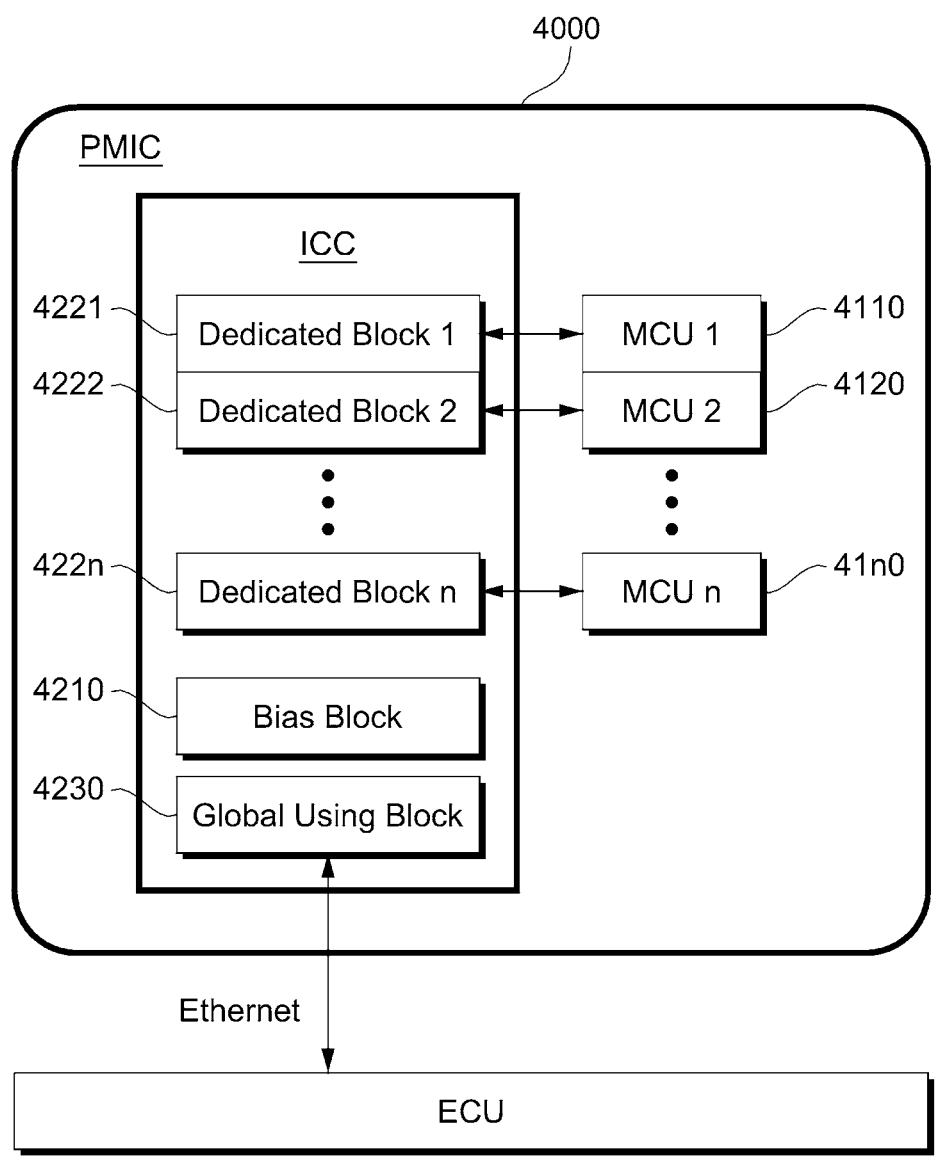
FIG. 10 illustrates a power management integrated circuit (PMIC) according to example embodiments of the present disclosure.

FIG. 10 illustrates a power management integrated circuit (PMIC) according to example embodiments of the present disclosure. Referring to FIG. 10, the PMIC may include a plurality of microcontroller units 4110, 4120, . . . , and 41$n$0 ($n$ being an integer greater than or equal to 2) and an integrated control circuit (ICC) 4200 configured to manage powers supplied to the plurality of microcontroller units 4110, 4120, . . . , and 41$n$0.

The integrated control circuit 4200 may include a bias block 4210, a plurality of specific use blocks 4221, 4222, . . . , and 422$n$ and a global using block 4230. The bias block 4210 and the dedicated block 4221, 4222, . . . , and 422$n$ may be implemented the same as the bias block 310 and the specific use blocks 320 and 330 described above. The global using block 4230 may manage power of an external electronic control unit (ECU) through wire/wireless communication. In example embodiments, the global using block 4230 may control an external electronic control unit (ECU) through a pulse width modulation (PWM) signal.

In the present disclosure, logics and registers are classified according to function of each configuration block to ensure independence of each of a plurality of systems (microcomputers) in a semiconductor which integrates and supports powers/functions of the systems (microcomputers). In particular, independence of each system may be ensured by adding a master selection block in a common use block. In a multi-system which uses two or more microcomputers (μC), a single integrated circuit (IC) may ensure independence in operation of each system and support power/input/output functions of each multi-system. This operation may be controlled in the two or more independent microcomputers (μC).

Typically, independent semiconductors for each microcomputer have been used to support an operation of each microcomputer in a system which uses two or more microcomputers. For example, when assuming two microcomputers which respectively drive A/B systems, specific use power, a monitoring semiconductor, a driving semiconductor, etc. of each of microcomputers A and B have been used. Meanwhile, the present disclosure provides a register setup method in which a single integrated semiconductor supporting power/driving functions of a plurality of microcomputers is used in a system which uses two or more microcomputers and independence between multiple masters of an integrated semiconductor is ensured. Additionally, the present disclosure provides a power/driving integrated semiconductor which ensures independence between two or more masters and a register setup method which may ensure independence of multi-master.

As described above, a multi-master system, a power controller, and an operating method of the multi-master system according to example embodiments of the present disclosure include a single integrated control circuit which supports powers/functions of a plurality of masters. Accordingly, a chip size may be reduced.

Additionally, a multi-master system, a power controller, and an operating method of the multi-master system according to example embodiments of the present disclosure may ensure independence in operation of each master with a register setup method.

Although the present disclosure and its advantages have been described in detail, it should be understood that various changes, substitutions and alterations can be made herein without departing from the spirit and scope of the disclosure as defined by the following claims.

What is claimed is:

1. A multi-master system comprising:
 a first master;
 a second master; and
 an integrated control circuit controlled by each of the first and second masters,
 wherein the integrated control circuit comprises:
  a bias block configured to provide at least one bias required to perform functions of the integrated control circuit;
  a first dedicated block configured to provide a first function to the first master;
  a second dedicated block configured to provide a second function to the second master; and
  a global using block configured to provide a common function to each of the first and second masters, and
 wherein the bias block is an un-configurable block which cannot be set up by the first and second masters,
 wherein the global using block is controlled by one of the first and second masters,
 wherein the integrated control circuit further comprises a first selection register configured to store information associated with the first function and the common function and a second selection register configured to store information associated with the second function and the common function,
 wherein the first selection register includes a first available configuration register which stores a first setup information of the common function for the first master, the first setup information being determined by the first master, and
 wherein the second selection register includes a second available configuration register which stores a second setup information of the common function for the second master, the second setup information being determined by the second master.

2. The multi-master system of claim 1, wherein the bias block includes a bandgap reference generator, an oscillator or a current source.

3. The multi-master system of claim 1, wherein the first selection register includes a first bias register configured to store flag information associated with the bias block, and
 the second selection register includes a second bias register configured to store the flag information.

4. The multi-master system of claim 1, wherein the first selection register includes the first available configuration register configured to store information associated with the first function and configured to store information associated with the common function, and
 the second selection register includes the second available configuration register configured to store information associated with the second function and configured to store information associated with the common function.

5. The multi-master system of claim 4, wherein the global using block is controlled by one of the first and second masters according to values stored in the first and second available configuration registers.

6. The multi-master system of claim 4, wherein the global using block is controlled by an external electronic control unit of the multi-master system according to values stored in the first and second available configuration registers.

7. The multi-master system of claim 4, wherein the integrated control circuit comprises:
 a master selection unit configured to generate a selection signal according to values stored in the first and second available configuration registers; and
 a multiplexer configured to select whether to connect the first master to the global using block or to connect the second master to the global using block in response to the selection signal.

8. The multi-master system of claim 1, further comprising:
 a first interface configured to perform serial communication between the first master and the global using block; and
 a second interface configured to perform serial communication between the second master and the global using block.

9. An operating method of a multi-master system, the operating method comprising:
 setting up specific use blocks configured to provide a specific use function to each of masters depending on first register setup;
 setting up a global using block configured to provide a common function of the masters depending on second register setup; and
 setting up a bias block configured to provide a bias required for the specific function depending on third register setup,
 wherein the second register setup is performed in response to a serial peripheral interface (SPI) command of each of the masters,
 wherein the global using block is controlled by one of the masters,
 wherein the bias block is an un-configurable block which cannot be set up by the masters,
 wherein a first selection register is configured to store information associated with a first function and the common function and a second selection register is configured to store information associated with a second function and the common function.

10. The operating method of claim 9, wherein setting up the bias block comprises:
   copying flag information corresponding to the bias; and
   storing the copied flag information in corresponding bias registers.

11. The operating method of claim 9, wherein setting up the specific blocks comprises:
   storing information associated with the specific use function in an available configuration register.

12. The operating method of claim 9, wherein setting up the global using block comprises:
   storing information associated with use of the common function in an available configuration register corresponding to each of the masters.

13. The operating method of claim 9, wherein the information associated with use of the common function includes information on whether it is unused, information associated with a master using the common function or error information.

\* \* \* \* \*